Sept. 1, 1925.   1,551,702
J. C. SCHAFFER
CONTROLLER FOR FEED MECHANISMS
Original Filed Sept. 20, 1919   3 Sheets-Sheet 1
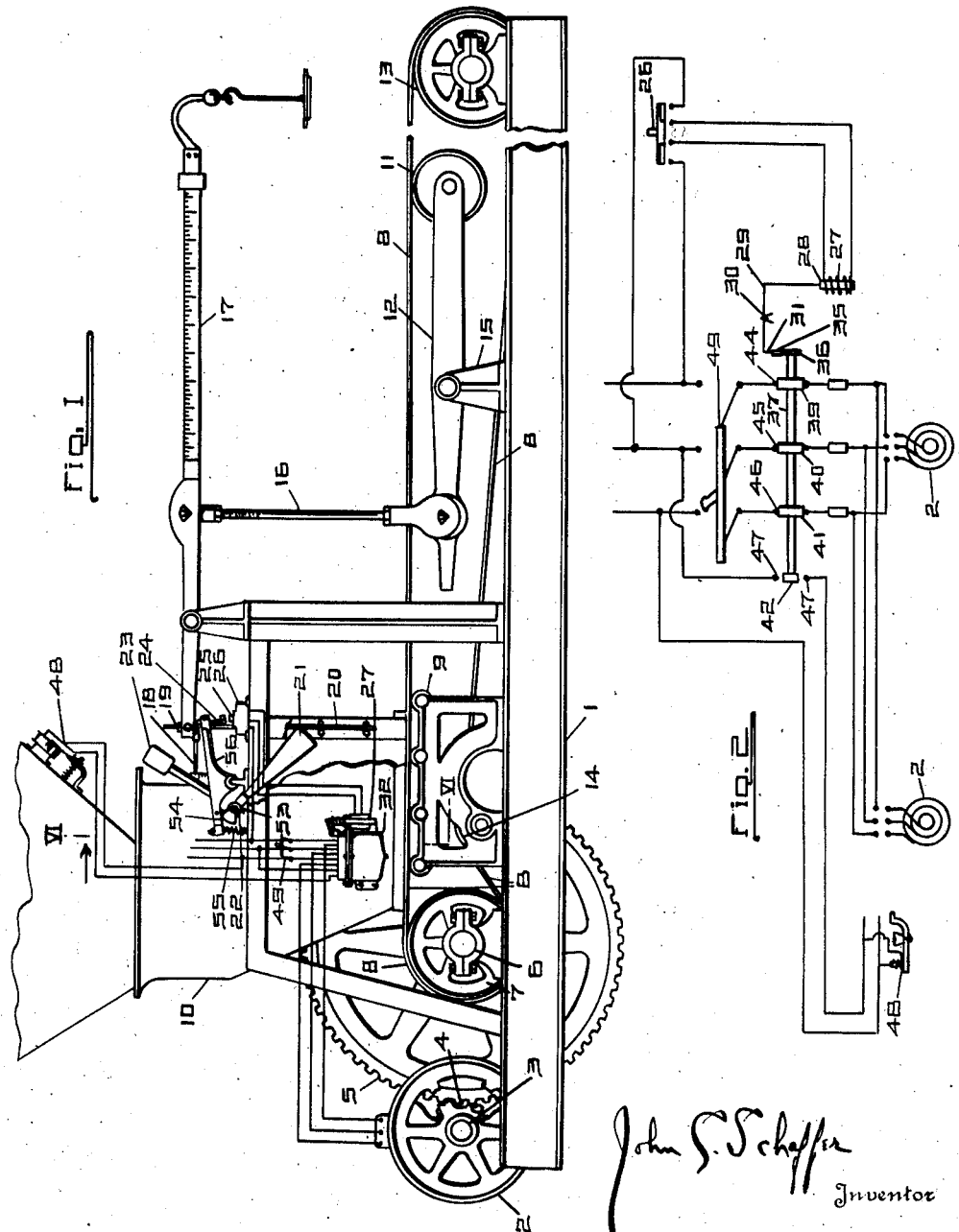

Sept. 1, 1925.
J. C. SCHAFFER
1,551,702
CONTROLLER FOR FEED MECHANISMS
Original Filed Sept. 20, 1919   3 Sheets-Sheet 2
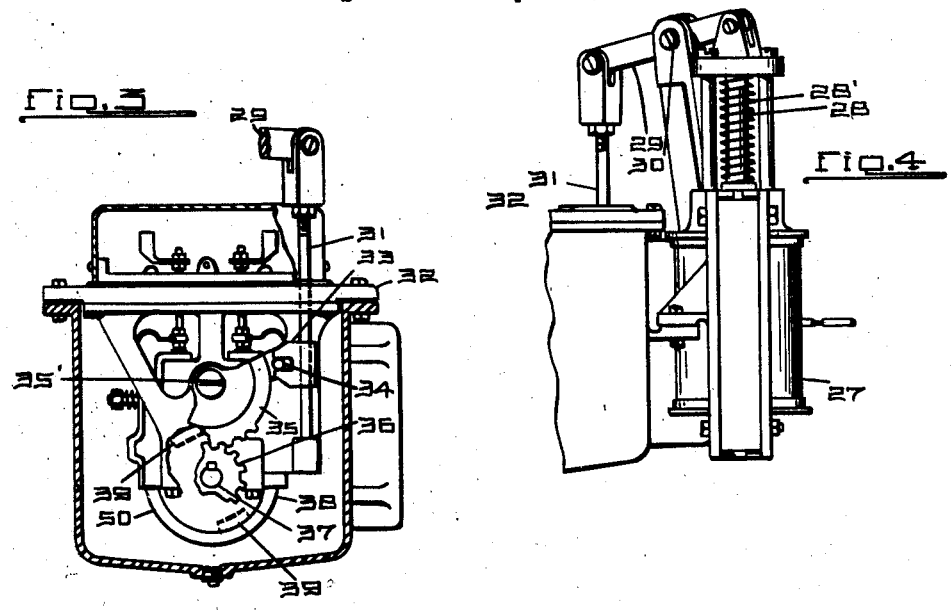
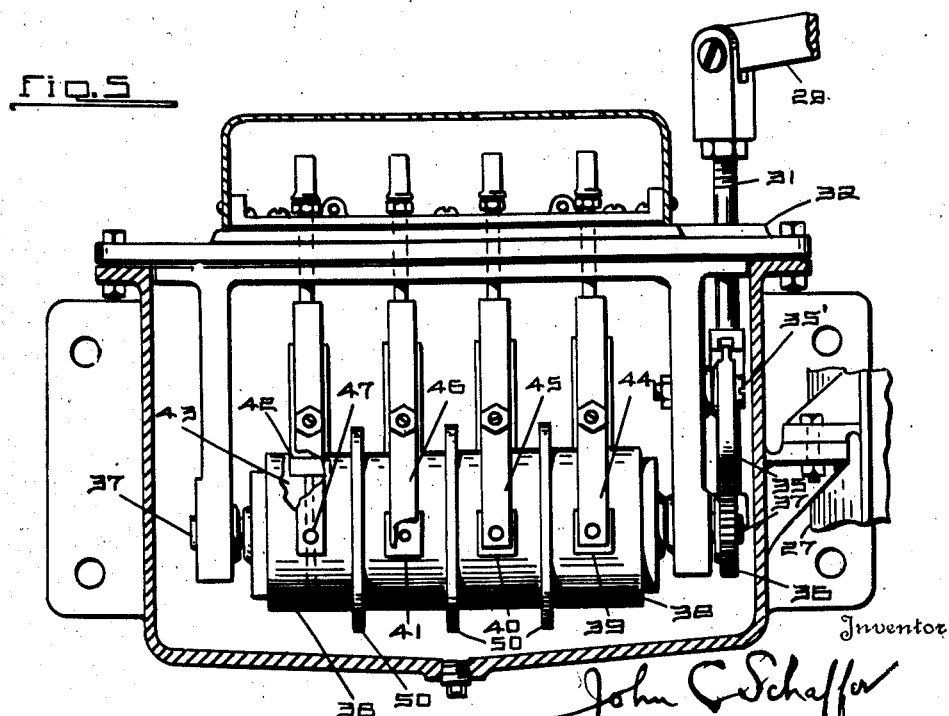
Inventor
John C. Schaffer
By Geo. E. Kirk
Attorney Sept. 1, 1925.
J. C. SCHAFFER
1,551,702
CONTROLLER FOR FEED MECHANISMS
Original Filed Sept. 20, 1919    3 Sheets-Sheet 3
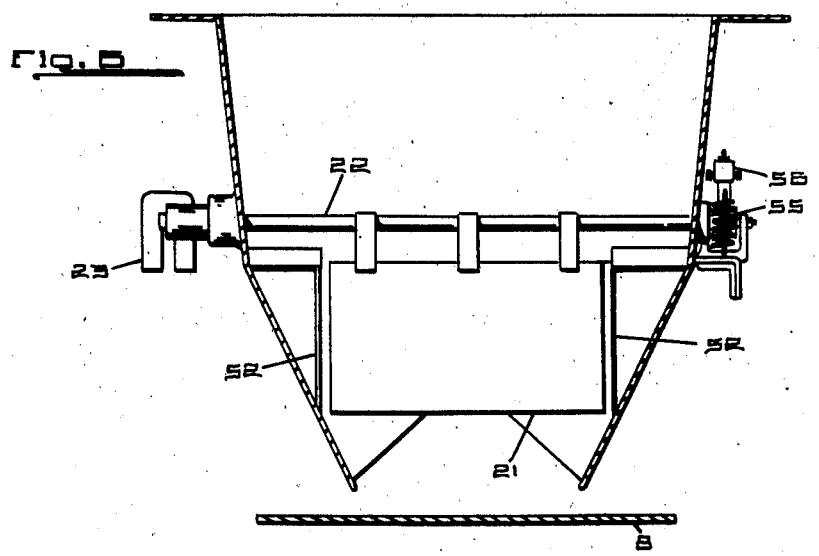
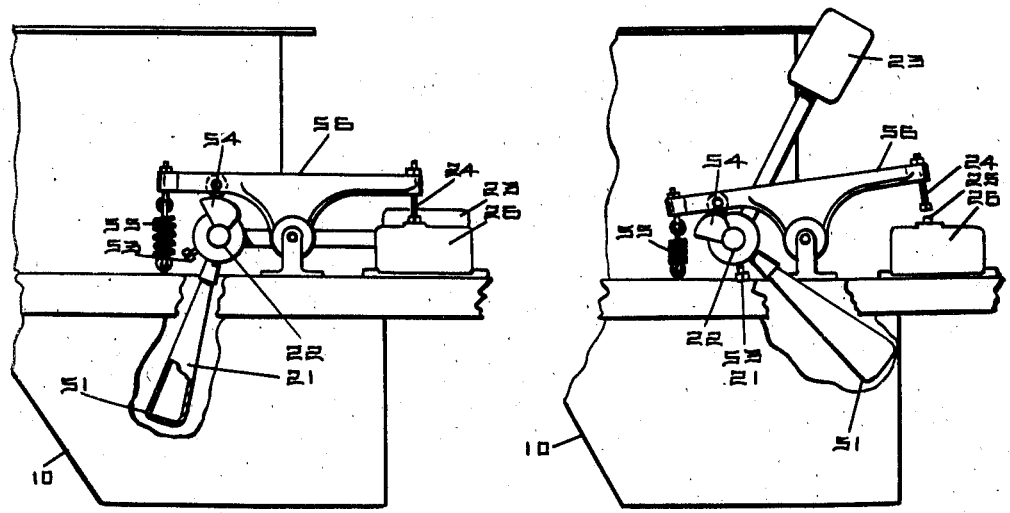

Patented Sept. 1, 1925.

1,551,702

UNITED STATES PATENT OFFICE.

JOHN C. SCHAFFER, OF PITTSBURGH, PENNSYLVANIA, ASSIGNOR TO SCHAFFER POIDOMETER COMPANY, OF PITTSBURGH, PENNSYLVANIA, A CORPORATION OF PENNSYLVANIA.

CONTROLLER FOR FEED MECHANISMS.

Application filed September 20, 1919, Serial No. 325,191. Renewed July 24, 1925.

*To all whom it may concern:*

Be it known that I, JOHN C. SCHAFFER, a citizen of the United States of America, residing at Pittsburgh, Allegheny County, Pennsylvania, have invented new and useful Controllers for Feed Mechanisms, of which the following is a specification.

This invention relates to control mechanism for material feeding devices.

This invention has utility when incorporated in connection with hopper and endless belt conveyor installations for quick response in automatic control of such readily flowing fine material as even hot gypsum.

Referring to the drawings:

Fig. 1 is a side elevation, with parts broken away, of an embodiment of the invention in connection with a feeding device;

Fig. 2 is a wiring diagram of the electrcal connections for the device of Fig. 1, which devices may be simultaneously controlled in parallel;

Fig. 3 is a detail view, with parts broken away, of the drum switch of the automatic control mechanism;

Fig. 4 is a view of the drum switch operating solenoid;

Fig. 5 is a longitudinal side elevation, with parts broken away, of the drum switch of Fig. 3;

Fig. 6 is a transverse section through the hopper on the line VI—VI, Fig. 1;

Fig. 7 is a fragmentary view of the hopper with the vane in hopper empty position; and Fig. 8 is a view similar to Fig. 7 with the vane in hopper full position.

A main frame 1 is provided upon which is mounted motor 2, having shaft 3, carrying pinion 4 in mesh with gear wheel 5 on shaft 6. This shaft 6, parallel to the shaft 3, is also carried by the frame 1 and has mounted thereon a pulley 7, over which passes conveyer belt 8. The upper reach of this belt 8 passes over rollers 9, under hopper 10, over roller 11, poised by scale lever 12. This roller 11 is preferably disposed about half way between the rollers 9 and idler 13. The lower or return reach of the belt 8 passes from idler 13 over idler 14 in its extent back to the pulley 7. The lever 12 of the weighing mechanism is mounted on fulcrum bearing 15 carried by the frame 1. The arm of the lever 12, remote from the roller 11, has upwardly extending therefrom link 16 to scale beam 17 having indicator 18 adjusted to the position desired for handling of material from the hopper 10 by the conveyor belt 8. The scale beam 17 adjacent the indicator 18 has downwardly extending rod 19 to gate 20 as a measuring control for the outlet from the hopper 10 to the belt 8.

In the hopper 10 and swingable away from the gate 20 is vane 21 mounted on shaft 22 and normally actuated by counterweight 23 to swing into the hopper 10 against material flow and away from the gate 20 as permitted by lack of supply of material in the hopper 10. Under the circumstances of material supply in the hopper 10 flowing therefrom this vane 21 is moved toward the gate 20. When this vane 21 is moved away from the gate 20, adjustable bolt 24 actuable by the gate 21 is thrown against push-button 25 to operate switch 26 as a remote control to energize solenoid 27 causing plunger 28 to be drawn down into the solenoid 27 against the resistance of spring 28', (Fig. 4).

This action or travel of the plunger 28 operates lever 29 mounted on fulcrum bearing 30 to lift bar 31 extending into housing 32. This bar 31 in housing 32 has fork 33 embracing finger 34 of segment 35 mounted on fixed bearing 35' in the housing 32. This segment 35 is in mesh with pinion 36 on shaft 37 carrying a multiple switch drum 38 having pairs of contacts 39, 40, 41, 42. This energizing of the solenoid 27 operates the drum member 38 for a rocking movement so that contacts 44, 45, 46, are away from respective pairs of contacts 39, 40, and 41, and contacts 47 are in position to connect or close the circuit through contacts 42, thereby bringing about a remote signal or control herein shown as an energizing of a vibrator 48 on the hopper 10 to effect a shaking down of material in the hopper 10 so that the vane 21 may be again moved toward the gate 20. This drum switch in one position effects driving of the belt 8 and in the other position operates vibrator 48. This opening of the switch 26 deenergizes the solenoid 27 so that the spring 28' may actuate the plunger 31 for rocking the drum 38 to close the circuits through contacts 44, 45, 46, to the motor 2 thereby starting the motor as the material supply effecting device, herein shown as the vibrator 48 is cut off, due to the terminals 47 being shifted away from the contacts 42. This vibrator 48 includes an arm rocked by a magnet to pound the inclined wall of the chute, thereby loosening material in the chute to flow downward.

For cutting off the motor 2 independently of this automatic electrical control, switch 49 may be operated. Insulation partitions or flanges 50 on the drum 38 between the series of contacts prevent flashing across when the control is used for gangs of large motors or in heavy current controls. This control for feeding mechanisms is simple in its structure and effective for large capacity machine operation with full assurance for definite response as desired at all times in automatic operation. Cooperating therewith for great accuracy of operation is the mechanical controller for this electrical mechanism.

The vane 21 is herein shown as of sheet metal and has its lower free end thickened to have the form of a wedge 51 as forced toward the loose material in the hopper 10 by means normally acting against the flow of material against the vane. This means is herein shown as the counter-weight 23. This configuration of the vane or flood gate 21 has such a drag action even on very fluffy freely flowing powders that such material is withdrawn from the hopper 10 by the conveyer, herein shown as the belt 8, and does not ooze or rush past the vane 21. Cheeks 52 in the hopper 10, shaping the hopper 10 to the ends of the vane 21, contribute also in precluding clogging of the vane from material working in behind the vane at the ends. The wedge 51 keeps the material from boiling up behind the vane at the bottom.

Set screw 53 permits adjustment of quick release cam 54 so that the action of the vane for control may be accurately adjusted for the quick automatic operation. A spring 55 is adjusted to hold rocker 56 against the cam 54 and with the hopper 10 full, the vane 21 is so swung that the cam 54 allows this normally acting means, herein shown as the spring 55, to hold the rocker 56 in switch opening position with the bolt 24 lifted from the push button 25.

In operation, should material supply in the hopper 10 fail, the vane 21 swings to close the switch 26 operating the solenoid 27 to throw the drum switch 37 for starting the material flow effecting means of vibrator 48 to loosen up the material to crowd down again into the hopper 10. As the vibrator 48 is started, the motor 2 is stopped.

When the material falls into the hopper 10 and swings the vane 21 toward the gate 20, the switch 26 is opened and the solenoid 27 is deenergized to allow the spring 28' to throw the drum 37 to shut off the vibrator or vibrators 48 and cut in the motor 2 for starting the belt 8. As the belt 8 passes under the vane 21 to withdraw the material from the hopper between the cheeks 52, the adjustable counter-weight 23 so crowds the wedge 51 into the loose material that its only tendency is to remain at rest to be withdrawn from the hopper 10. In this combination, with hot gypsum an accuracy of 99.61% has been attained in automatic operation.

The switch as cooperating herein upon stopping the motor 2, serves to replenish the material in the hopper 10. In this connection there may be analogy even of conveyor structure for delivery to and removal from the hopper 10 of the material to be handled.

What is claimed and it is desired to secure by Letters Patent is:

1. A hopper, a conveyor belt to which the hopper delivers, a driving motor for the belt, an electric power circuit for the motor, a switch in said power circuit, a vane in the hopper swingable by material flow through the hopper to the belt, means for moving the vane against material flow, an electric control circuit including a solenoid for the power circuit switch, and a switch in the control circuit, said vane as unobstructed by material flow in the hopper being shifted by said means to close said control circuit and energize said solenoid for opening the power circuit and stopping the motor, thereby cutting off belt travel from said hopper.

2. A hopper, a device effecting material supply for the hopper, a conveyor belt to which the hopper delivers, a driving motor for the belt, a vane in the hopper swingable by material flow to the belt, means for moving the vane against material flow, an electric circuit, a switch in said circuit operated by the vane, a solenoid controlled by the switch, a second electric circuit, and a switch therein for the motor controlled by the solenoid, starting the device as the driving motor is stopped.

3. A hopper, a conveyor belt to which the hopper delivers, means for effecting flow of material into the hopper, a power actuator for the means, a flow controlled vane in the hopper having its ends extending rearwardly from the active face of the vane and in proximity to the hopper sides to provide a thickened end for said vane, an electric circuit, and a switch in said circuit for the actuator controlled by the vane.

4. A hopper, a conveyor belt to which the hopper delivers, and a flow controlled vane in the hopper, said vane having a thickened free end to preclude material flow up back of the vane whereby the vane is free for movement by material flow at all times.

5. A hopper, a conveyor belt to which the hopper delivers, and a flow controlled vane in the hopper, said vane having its free end of wedge form and a counterweight normally urging the wedge form end of the vane into the material passing through the hopper to hold such material for belt removal from the hopper.

6. A hopper, a conveyor belt to which the hopper delivers, means for effecting the flow of material into the hopper, a power actuator for the means, a flow controlled vane in the hopper, a cam carried by the vane, a rocker operable by the cam, and a switch closed by the rocker for supplying power to the actuator.

7. A hopper, a conveyor belt to which the hopper delivers, means for effecting the flow of material into the hopper, a power actuator for the means, a flow controlled vane in the hopper, a cam carried by the vane, a rocker operable by the cam, a switch closed by the rocker for supplying power to the actuator, and means for making the rocker react against the cam normally to open the switch.

8. A hopper, a conveyor belt to which the hopper delivers, means for effecting the flow of material into the hopper, a power actuator for the means, a flow controlled vane in the hopper, an adjustable cam carried by the vane, a rocker operable by the cam, and a switch closed by the rocker for supplying power to the actuator.

9. A hopper, means for charging the hopper, means for discharging the hopper, a power actuator for the charging means, a flow controlled vane in the hopper, an adjustable rocker, a quick release cam on the vane coacting with the rocker, and a switch controlled by the rocker for energizing the charging actuator.

10. A hopper, means for charging the hopper, means for discharging the hopper, a power actuator for the charging means, a flow controlled vane in the hopper, an adjustable rocker, a quick release cam on the vane coacting with the rocker, and a switch controlled by the rocker determining the operation of the hopper discharging means.

11. A hopper, means for charging the hopper, means for discharging the hopper, a power actuator for the charging means, a flow controlled vane in the hopper, an adjustable rocker, a quick release cam on the vane coacting with the rocker, and a switch controlled by the rocker determining the operation of the hopper charging and discharging means.

In witness whereof I affix my signature.

JOHN C. SCHAFFER.